SYSTEM FOR RECORDING AND REPRODUCING STILL COLOR VIDEO SIGNALS

Filed Jan. 27, 1967 7 Sheets-Sheet 1

Inventor
Nobutoshi Kihara by

Inventor
Nobutoshi Kihara

Inventor
Nobutoshi Kihara
by

Aug. 11, 1970 NOBUTOSHI KIHARA 3,524,012

SYSTEM FOR RECORDING AND REPRODUCING STILL COLOR VIDEO SIGNALS

Filed Jan. 27, 1967 7 Sheets-Sheet 4

Inventor
Nobutoshi Kihara by

Inventor
Nobutoshi Kihara by

Inventor
Nobutoshi Kihara by

Inventor
Nobutoshi Kihara by

United States Patent Office 3,524,012
Patented Aug. 11, 1970

3,524,012

SYSTEM FOR RECORDING AND REPRODUCING STILL COLOR VIDEO SIGNALS

Nobutoshi Kihara, Tokyo, Japan, assignor to Sony Corporation, Tokyo, Japan, a corporation of Japan Filed Jan. 27, 1967, Ser. No. 612,179
Claims priority, application Japan, Jan. 31, 1966, 41/5,504, 41/5,505
Int. Cl. H04n 5/78
U.S. Cl. 178—5.4 7 Claims

ABSTRACT OF THE DISCLOSURE

A color video signal recording and reproducing system having one image pickup tube, a rotary color filter, and a video signal recording and reproducing device, the image pickup tube producing color video signals separated by the rotary color filter, the color video signals being separately recorded and reproduced at the same time by the video signal recording and reproducing device.

BACKGROUND OF THE INVENTION

This invention relates to a color video signal recording and reproducing system in which a plurality of color still pictures are recorded on a rotary magnetic sheet or played back therefrom by the use of a one-gun pickup tube, and which is adapted to be capable of re-recording the recorded signals on an auxiliary device at any time.

The prior art, to the applicant's knowledge, involves complex systems for producing the color video signals and complex control systems for re-recording the recorded signals.

SUMMARY OF THE INVENTION

By the use of an apparatus adapted such that one field or frame or its multiple of video signals are recorded on a rotary magnetic sheet while forming an annular magnetic track or tracks thereon, desired pictures can be sequentially reproduced on a cathode ray tube in a manner similar to that of projection for slides of optical photographic films. Further, it is very convenient for the so-called editing if one portion of the contents or whole contents recorded in a main device can be re-recorded in an auxiliary device at any time.

The principal object of this invention is to provide an apparatus capable of satisfying such a requirement.

Other objects, features and advantages of this invention will become apparent from the following description taken in conjunction with the accompanying drawings.

DESCRIPTION OF THE PREFERRED EMBODIMENTS

In FIGS. 1, 3, 6 and 7, the set input terminals of multivibrators shown therein are indicated by the letter *s* and the reset input terminals of the multivibrators by the letter *r*. The output terminal of the multivibrators in FIGS. 1, 3, 6 and 7, whose outputs are shown in FIGS. $2E_R$, $2E_G$, $2E_B$, $2F_R$, $2F_G$, $2F_B$, $2G_R$, $2G_G$, $2G_B$, 4D, $4F_R$, $4F_G$, $4F_B$, $4G_R$, $4G_G$,$4G_B$, 5D and 5E, are indicated by the letter *y*, in accordance with conventional practice, wherein the multivibrators shown in the figures have a positive output in the set state and no output in the reset state. The $\bar{y}$ output terminal of the multivibrators is not shown as it forms no part of the invention as shown and described.

Figure 1:
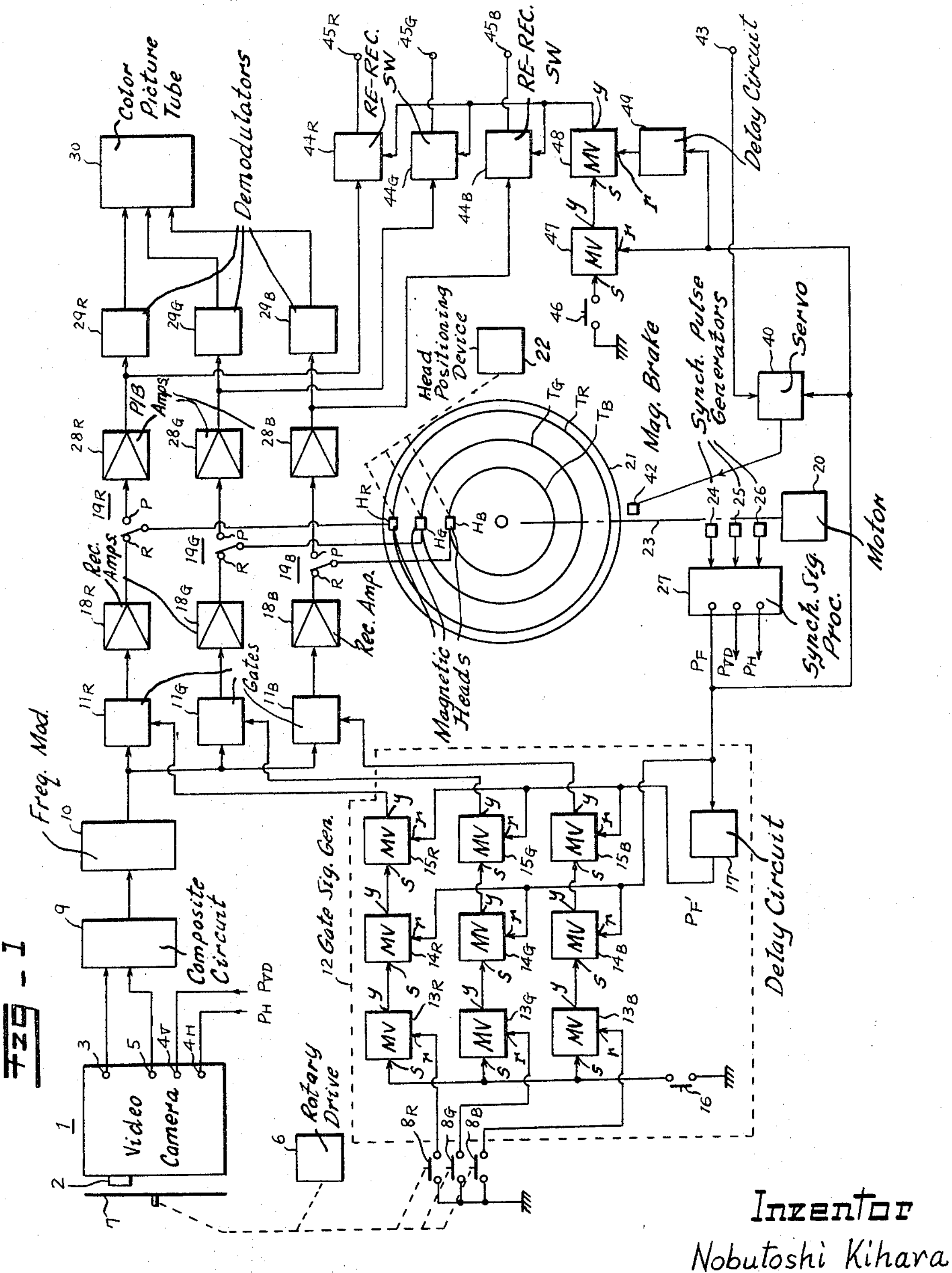
FIG. 1 is a diagram systematically illustrating one example of a main device of a video signal recording and reproducing apparatus of this invention.

In FIG. 1 reference numeral 1 indicates a camera comprising one monochrome pickup tube 2, a synchronizing signal generator, a pickup tube driving circuit and so on, which includes a video signal output terminal 3, external horizontal and vertical synchronizing pulse input terminals 4H and 4V and a synchronizing signal output terminal 5. In front of the pickup tube 2 there is disposed a rotary optical color filter 7 which is driven by a driving device 6 to rotate once in about ten seconds and is so designed that three regions divided at rotary angular intervals of approximately 120° serve as red, green and blue filter elements. To the rotary shaft of the rotary color filter a cam is affixed at a predetermined position, and color index contacts 8R, 8G and 8B to be selectively driven by rotation of the cam are disposed and arranged in such a manner as to operate immediately before the red, green and blue filter elements respectively gets out of opposing relation or get in to the pickup tube 2.

Figure 2:
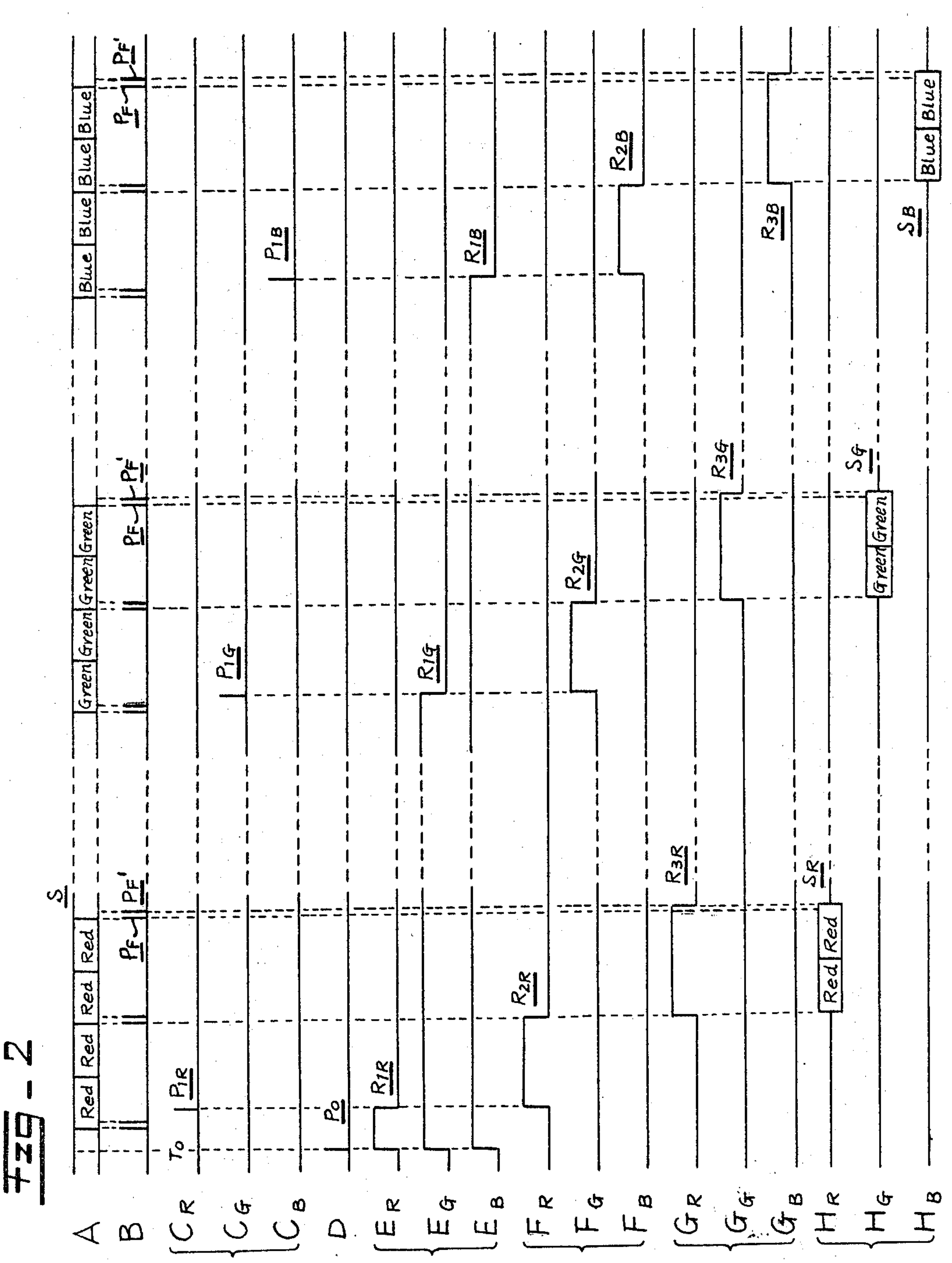
FIG. 2 illustrates signal arrangements for explaining the main device exemplified in FIG. 1.

An output video signal obtained from the output terminal 3 of the camera 1 is applied to a frequency modulator 10 through a composite circuit 9 for combining the output video signal and a synchronizing signal obtained from the output terminal 5. The frequency modulated video signal is fed to gate circuits 11R, 11G and 11B of red, green and blue colors respectively. The color index contacts 8R, 8G and 8B are connected to a gate signal generator 12 for supplying the gate circuits 11R, 11G and 11B with gate signals respectively. The gate signal generator 12 comprises bi-stable multivibrator (flip-flop) circuits 13R, 13G and 13B which are reset by closure of the color index contacts 8R, 8G and 8B respectively, multivibrator circuits 14R, 14G and 14B which are set by the outputs of the above-mentioned ones 13R, 13G and 13B, respectively and multivibrator circuits 15R, 15G and 15B which are set by the outputs of the second-mentioned ones 14R, 14G and 14B, also respectively, the multivibrator circuits of each group being connected in series and in cascade to those of the other groups, as illustrated in FIG. 1. The outputs of the multivibrator circuits 15R, 15G and 15B are applied as gate signals to the gate circuits 11R, 11G and 11B respectively. In this case, however, the multivibrator input circuits 13R, 13G and 13B are connected together to a recording push button switch 16 in common thereto. With such an arrangement, the multivibrator circuits 13R, 13G and 13B are set by a pulse $P_0$ emanating from the recording switch 16 at a time $T_0$ such as depicted in FIG. 2D. The multivibrator circuit 13R is reset by a pulse $P_{1R}$ such as shown in FIG. $2C_R$ which is produced when the color index contact 8R is put in the on-state in response to rotation of the rotary color filter 7, thus producing a rectangular wave $R_{1R}$ such as shown in FIG. $2E_R$. Following this, the multivibrator circuit 13G is reset by a pulse $P_{1G}$ such as depicted in FIG. $2C_G$ which is produced when the color index contact 8G is put in the on-state, producing a rectangular wave $R_{1G}$ shown in FIG. $2E_G$. Thereafter, the multivibrator circuit 13B is reset by a pulse $P_{1B}$ such as depicted in FIG. $2C_B$ which is yielded when the color index contact 8B is put in the on-state, producing a rectangular wave $R_{1B}$ shown in FIG. $2E_B$. The outputs of the multivibrator circuits 13R, 13G and 13B are applied respectively to set terminals of the multivibrator circuits 14R, 14G and 14B, and their reset terminals are supplied with synchronizing pulses $P_F$ of 30 c./s. shown in FIG. 2B which are obtained from the rotary shaft of a rotary magnetic sheet described later. As a result of this, the multivibrator circuit 14R produces a rectangular wave $R_{2R}$ such as shown in FIG. $2F_R$ which is set at the falling edge of the rectangular wave $R_{1R}$ and reset by the synchronizing pulse $P_F$, and similarly the multivibrator circuits 14G and 14B respectively produce rectangular waves $R_{2G}$ aid $R_{2B}$ such as illustrated in FIGS. $2F_G$ and $2F_B$. Further, the outputs of the multivibrator circuit 14R, 14G are applied to set terminals of the multivibrator circuits 15R, 15G and 15B, and their reset terminals are supplied with synchronizing pulses $P_F'$ obtained by applying synchronizing pulses $P_F$ to a delay circuit 17 where they are slightly delayed by the delay circuit 17. The slight delay effected by delay circuit 17 is sufficiently small so that each delayed pulse $P_F'$ will lag behind the respective synchronizing pulse $P_F$ by a period that is less than that required for the fall-off to zero of the signals $R_{2R}$, $R_{2G}$ and $R_{2B}$ from multivibrator circuits 14R, 14G and 14B. Thus, each of multivibrator circuits 15R, 15G and 15B, which is set by the fall-off to zero of the output from the corresponding circuit 14R, 14G or 14B, will only be reset by the delayed pulse $P_F'$ corresponding to the synchronizing pulse $P_F$ which next follows the synchronizing pulse $P_F$ that reset the circuit 14R, 14G or 14B. Consequently, the multivibrator circuit 15R yields a rectangular wave $R_{3R}$ having approximately one frame period as shown in FIG. $2G_R$, and in a similar manner the multivibrator circuits 15G and 15B respectively produce rectangular waves $R_{3G}$ and $R_{3B}$ such as illustrated in FIGS. $2G_G$ and $2G_B$.

The rectangular waves $R_{3R}$, $R_{3G}$ and $R_{3B}$ are applied to the gate circuits 11R, 11G and 11B as gate signals. Meanwhile, the arrangement of video signals S emanating from the output terminal 3 is such as shown in FIG. 2A which consist of a plurality of video signals representative of red, green and blue colors, each color coming in succession for a period of approximately three seconds, and the video signals are produced in synchronism with the synchronizing pulses $P_F$, since synchronizing pulses $P_{VD}$ synchronously related to the pulses $P_F$ are applied to the camera 1. Accordingly, the gate circuit 11R produces red video signals $S_R$ such as depicted in FIG. $2H_R$ which is of approximately one frame of the red video signal period of the video signals S of such an arrangement, and similarly the gate circuits 11G and 11B produce green and blue video signals $S_G$ and $S_B$ such as shown in FIGS. $2H_G$ and $2H_B$.

The red, green and blue video signals $S_R$, $S_G$ and $S_B$ thus obtained from the gate circuits 11R, 11G and 11B are applied to magnetic heads $H_R$, $H_G$ and $H_B$ respectively through recording amplifiers 18R, 18G and 18B and through recording contacts R of recording-play back switches 19R, 19G and 19B.

The magnetic heads $H_R$, $H_G$, and $H_B$ are disposed in contact with a rotary magnetic sheet 21 in such a manner that they may move while being spaced apart at predetermined intervals diametrically of the magnetic sheet 21, which is coupled with a driving apparatus including a motor 20 driven by a commercial power source at 30 revolutions per second in synchronism with its power source frequency. Reference numeral 22 identifies a positioning device for the magnetic heads.

With such an arrangement, the video signals $S_R$, $S_G$ and $S_B$ illustrated in FIGS. $2H_R$, $2H_G$ and $2H_B$ are recorded on the magnetic sheet 21 while forming annular magnetic tracks $T_R$, $T_G$ and $T_B$ respectively. In this case, the video signals $S_R$, $S_G$ and $S_B$ are produced from the gate circuits 11R, 11G and 11B gated by the gate signals which are obtained from the multivibrator circuits 15R, 15G and 15B controlled by the aforementioned delayed synchronizing pulses $P_{F'}$, so that the video signals to be recorded do not cut out the end portion of the frame. Accordingly, if the rotation speed of the magnetic sheet is varied the continuous annular tracks $T_G$, $T_R$ and $T_B$ are recorded on the sheet without cutting out the end portions of the frame at the beginning and end of the tracks. The rotary shaft 23 of the rotary magnetic sheet 21 has affixed thereto a pair of pulse generators 24 and 25 spaced apart at an angular distance of approximately 180°, which produce synchronizing pulses of 30 c./s. displaced 180° apart in phase. Further, another pulse generator 26 is affixed to the rotary shaft 23, which produces horizontal synchronizing pulses of 15.75 kc. These signals are applied to a synchronizing signal processor 27, producing the aforementioned synchronizing pulses $P_F$ of 30 c./s., the synchronizing pulses $P_{VD}$ of 60 c./s. having a vertical synchronizing frequency and the horizontal synchronizing pulses $P_H$ of 15.75 kc. These pulses are fed to the aforementioned multivibrator circuits 14R, 14G and 14B, delay circuits 17 and input terminals 4V and 4H respectively.

In the circuit 9 the video signals are combined with the synchronizing signals emanating from the synchronizing signal output terminal 5 of the camera 1, so that the video signals are recorded on the aforementioned magnetic sheet 21 as including the horizontal and vertical synchronizing signals.

During playback the magnetic heads $H_R$, $H_G$ and $H_B$ are connected respectively to playback amplifiers 28R, 28G and 28B through playback contacts P of the switches 19R, 19G and 19B, playing back the red, green and blue video signals recorded on the magnetic tracks $T_R$, $T_G$ and $T_B$ simultaneously and repeatedly. The repeatedly played back video signals are applied respectively to demodulators 29R, 29G and 29B, the output of which are fed to a color picture tube 30. This makes it possible to observe a still color picture reproduced on the color picture tube.

In practice, upon pushing the recording contact 16 the video signals are recorded as still color picture signals of one frame and at the same time the heads $H_R$, $H_G$ and $H_B$ are moved by the positioning device, and the next pushing of the recording contact leads to recording of still color picture signals of the next frame on the magnetic sheet 21 while forming annular magnetic tracks at places different from those of the previous recording. With such operations repeatedly carried out, still color pictures of 40–50 scenes are recorded on the magnetic sheet 21 according to the diameter of the sheet employed. Accordingly, the still color pictures thus recorded can be reproduced on the color picture tube in a manner similar to that of projection of slides using optical color films.

In the video signal arrangement during recording in the foregoing, the video signals $S_R$, $S_G$ and $S_B$ are spaced apart in time at sufficiently long intervals (approximately three seconds in the above example) from a consideration of the case where a vidicon tube having a relatively long residual image time constant is employed as the pickup tube 2. This avoids color mixing and ensures provision of a vivid color picture.

Figure 3:
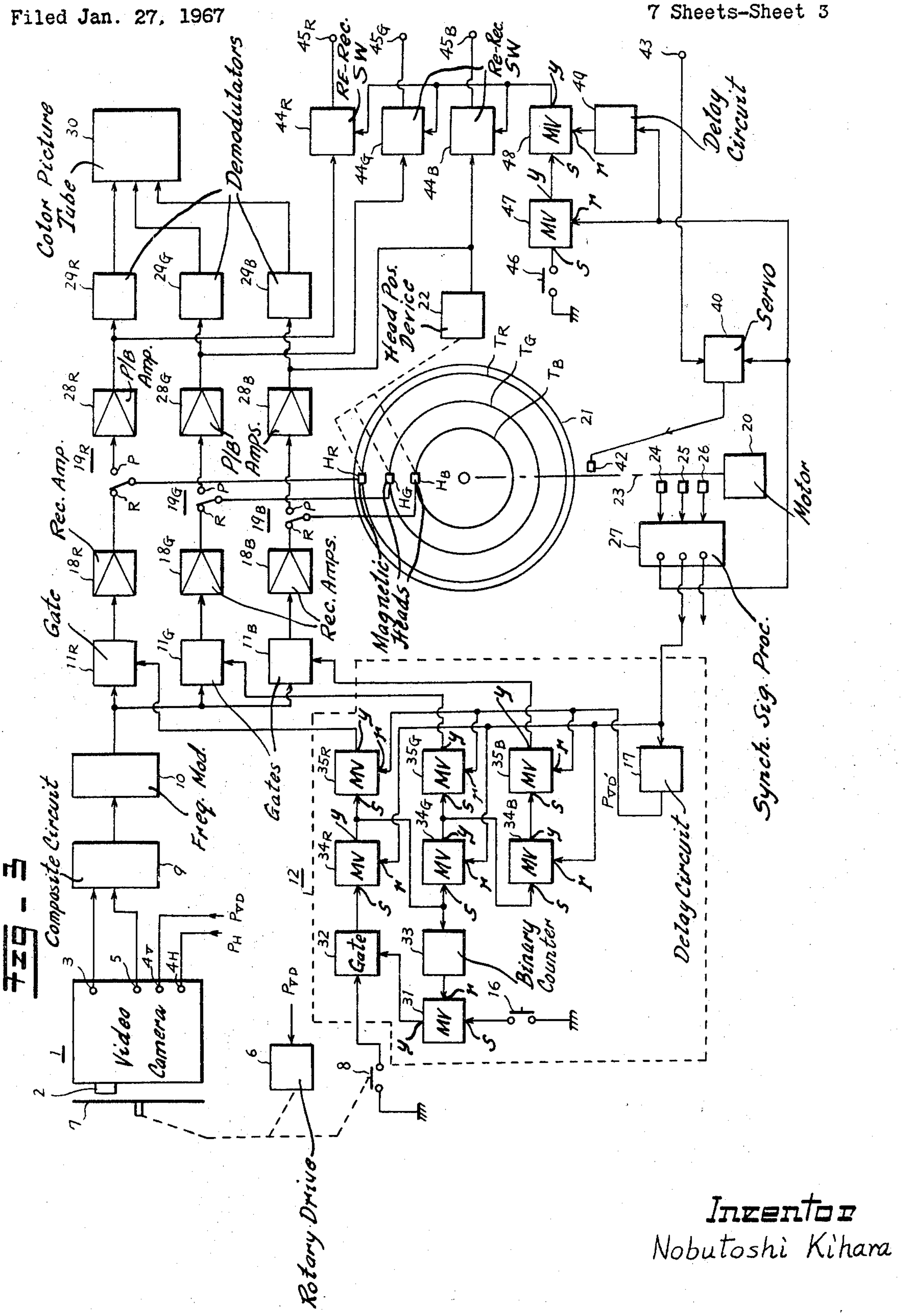
FIG. 3 is a diagram systematically illustrating another example of the main device of this invention.

In the case of using, for example, an image orthicon tube having a very short residual image time constant, the driving system for the rotary color filter 7, the gate signal generator 12 and the structures related thereto are changed to those shown in FIG. 3 which will hereinbelow be described. That is, in order to control rotation of a rotary color filter 7 at 20 c./s., synchronizing pulses $P_{VD}$ of, for instance, 60 c./s. are applied to a driving device 6 of the filter 7 from a circuit 27, constituting a servo. Further, one index contact is employed for producing pulses in relation to the rotary color filter 7 and is so disposed as to produce pulses when, for example, a blue filter element remains in opposing relation to a pickup tube 2. Reference numeral 8 indicates this contact.

Figure 4:
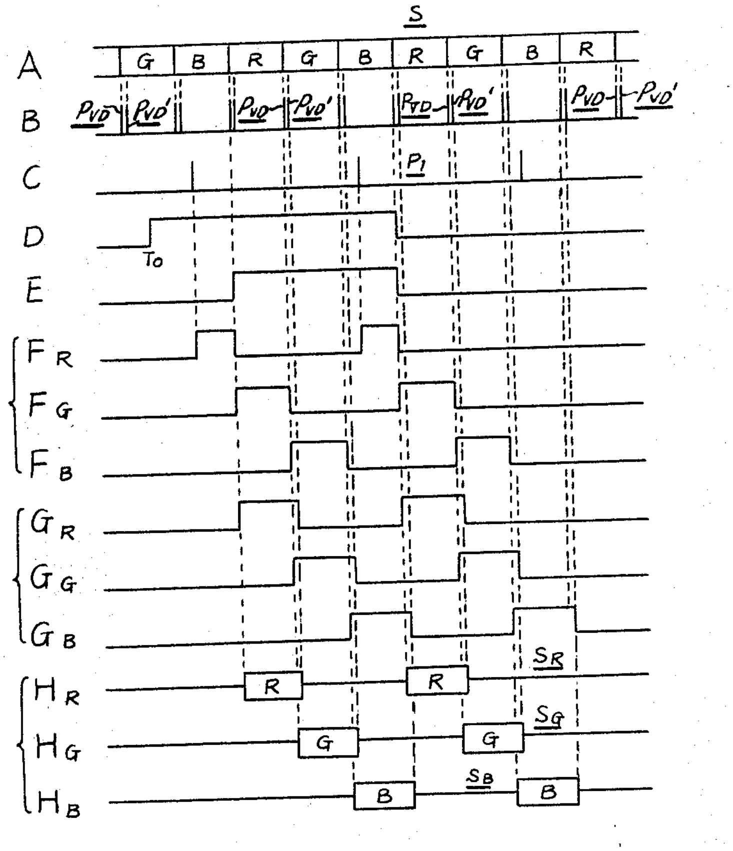
FIG. 4 illustrates signal arrangements for explaining the device depicted in FIG. 3.

In a gate signal generator 12 a recording contact 16 is connected to the set side of a bi-stable multivibrator (flip-flop) circuit 31, the output side of which is connected to a gate circuit 32. The gate circuit 32 has connected thereto the index contact 8 and passes the pulses therefrom to set a multivibrator circuit 34R. The output end of the multivibrator circuit 34R is connected to the input end of a binary counter 33, the output end of which is connected to the reset terminal of the multivibrator 31 to reset multivibrator 31 after a predetermined interval such as the completion of one field for each primary color. The counter 33 is set by the falling edge of the rectangular wave output of multivibrator 34R and reset by the falling edge of the next successive rectangular wave output of multivibrator 34R, as shown in FIGS. 4E which is the output of counter 33, 4D which is the output of multivibrator 31 and $4F_R$ which is the rectangular wave output of multivibrator 34R. The reset terminal of the multivibrator circuit 34R has applied thereto synchronizing pulses $P_{VD}$ of 60 c./s. from a synchronizing signal processor 27. The output end of the multivibrator circuit 34R is also connected to the set ends of multivibrator circuits 35R and 34G. To the reset end of the multivibrator circuit 35R are applied synchronizing pulses $P_{VD}$ obtained by applying the synchronizing pulses $P_{VD}$ to a delay circuit 17, and the synchronizing pulses $P_{VD}$ are applied also to the multivibrator circuit 34G and as a result of this the multivibrator circuit 35R produces gate signals for a gate circuit 11R of red color. The output end of the multivibrator circuit 34G is connected to the set ends of multivibrator circuit 35G and 34B, and the delay synchronizing pulses $P_{VD}$ are applied also to the reset end of the multivibrator circuit 35G and the synchronizing pulses $P_{VD}$ are also supplied to the reset end of the multivibrator circuit 34B, so that the multivibrator circuit 35G produces gate signals for a gate circuit 11G of green color. The output end of the multivibrator circuit 34B is connected to the set end of multivibrator circuit 35B and the delayed synchronizing pulses $P_{VD}$ are also applied to the reset end of the circuit 35B and, as a result, the circuit 35B produces gate signals for a gate circuit 11B of blue color.

With such an arrangement, video signals shown in FIG. 4A are produced at the output end 3 of the camera 1. Since the synchronizing pulses $P_{VD}$ and $P_{VD'}$ are as depicted in FIG. 4B and pulses $P_1$ obtained periodically at the contact 8 are as shown in FIG. 4C, the multivibrator circuit 31, the counter 33, the multivibrator circuit 34R, 34G and 34B and the multivibrator circuits 35R, 35G and 35B respectively produce rectangular waves such as illustrated in FIGS. 4D, 4E, $4F_R$, $4F_G$, $4F_B$, $4G_R$, $4G_G$ and $4G_B$. Consequently, the rectangular waves depicted in FIGS. $4G_R$, $4G_G$ and $4G_B$ serve as gate signals to control the gate circuits 11R, 11G and 11B respectively, and accordingly the video signals $S_R$, $S_G$ and $S_B$ of such arrangements as shown in FIGS. $4H_R$, $4H_G$ and $4H_B$ are applied respectively to magnetic heads $H_R$, $H_G$ and $H_B$, by which the red, green and blue video signals are recorded in approximately six-field periods while forming magnetic tracks $T_R$, $T_G$ and $T_B$.

A description will be given in connection with a circuit by which signals recorded on the above-described apparatus serving as a main device are recorded on the rotary magnetic sheet of other auxiliary recording device at any time. A servo circuit 40 which includes a comparing circuit is provided for synchronizing rotation of the rotary magnetic sheet of the auxiliary recording device with that of the sheet of the main device. In this example the servo circuit 40 and the driving apparatus 20 are provided separately, but it is possible to incorporate the servo circuit in the driving apparatus 20 to thereby control the driving motor of the rotary magnetic sheet 21. The servo circuit 40 in the present example controls a magnetic brake device 42 affixed to the rotary shaft 23 of the rotary magnetic sheet 21 with error signals resulting from comparison of the synchronizing pulses $P_F$ of of the main device with those $P_F$ of the auxiliary device, thus constituting a servo loop. Accordingly, the main device is provided with an input terminal 43 for receiving the synchronizing pulses $P_F$ from the auxiliary device.

Then, re-recording switching circuits 44R, 44G and 44B are connected to the output sides of the playback amplifiers 28R, 28G and 28B of the magnetic heads $H_R$, $H_G$ and $H_B$, and output terminals 45R, 45G and 45B respectively leading from the amplifiers of the main device to the auxiliary device are provided and a re-recording switch 46 is provided. With energization of the switch 46, switching signals are produced for the switching circuits 44R, 44G and 44B.

Figure 5:
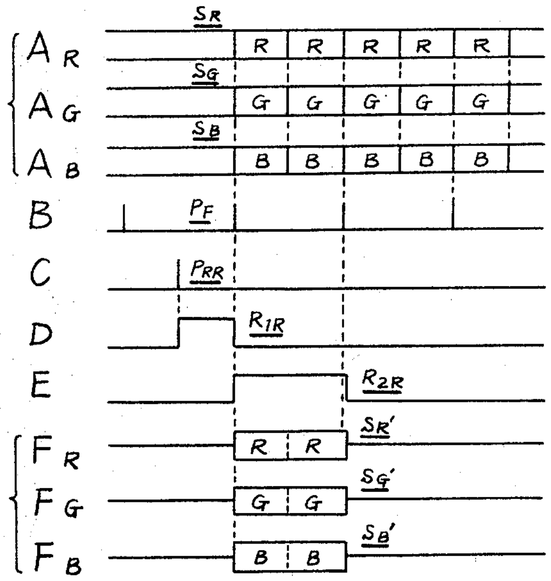
FIG. 5 illustrates a series of signal arrangements for describing the operations of additional components equipped in the main devices shown in FIGS. 1 and 3.

To this end, the switch 46 is connected to the set side of a multivibrator (flip-flop) circuit 47, to the reset side of which is applied the pulses $P_F$. As a result of this, the multivibrator circuit 47 is set by a pulse $P_{RR}$, which is depicted in FIG. 5C and based upon the operation of the switch 46. Thus a rectangular wave $R_{1R}$ shown in FIG. 5D which is reset by the pulse $P_F$ depicted in FIG. 5B is obtained. Then, the rectangular wave $R_{1R}$ is fed to the set side of a multivibrator circuit 48 to set it, and the multivibrator circuit 48 is reset by a pulse $P_{F'}$ produced by applying the pulse $P_F$ to a delay circuit 49 (the output of the delay circuit 49 may be utilized). This leads to the provision of a rectangular wave $R_{2R}$ such as shown in FIG. 5E. This rectangular wave $R_{2R}$ is applied simultaneously to the switching circuits 44R, 44G and 44B to control them to permit passage of the reproduced video signals $S_R$, $S_G$ and $S_B$ shown in FIGS. $5A_R$, $5A_G$ and $5A_B$ only in the duration of the rectangular wave $R_{2R}$. Accordingly, the video signals $S_R$, $S_G$ and $S_B$ of one frame or more such as shown in FIGS. $5F_R$, $5F_G$ and $5F_B$ are applied respectively to the output terminals 45R, 45G and 45B of the main device. In such a case if the rotation speed of the magnetic sheet of the auxiliary device is varied, also the continuous tracks $T_{G'}$, $T_{R'}$ and $T_{B'}$ are recorded on the sheet without intermittent.

Figure 6:
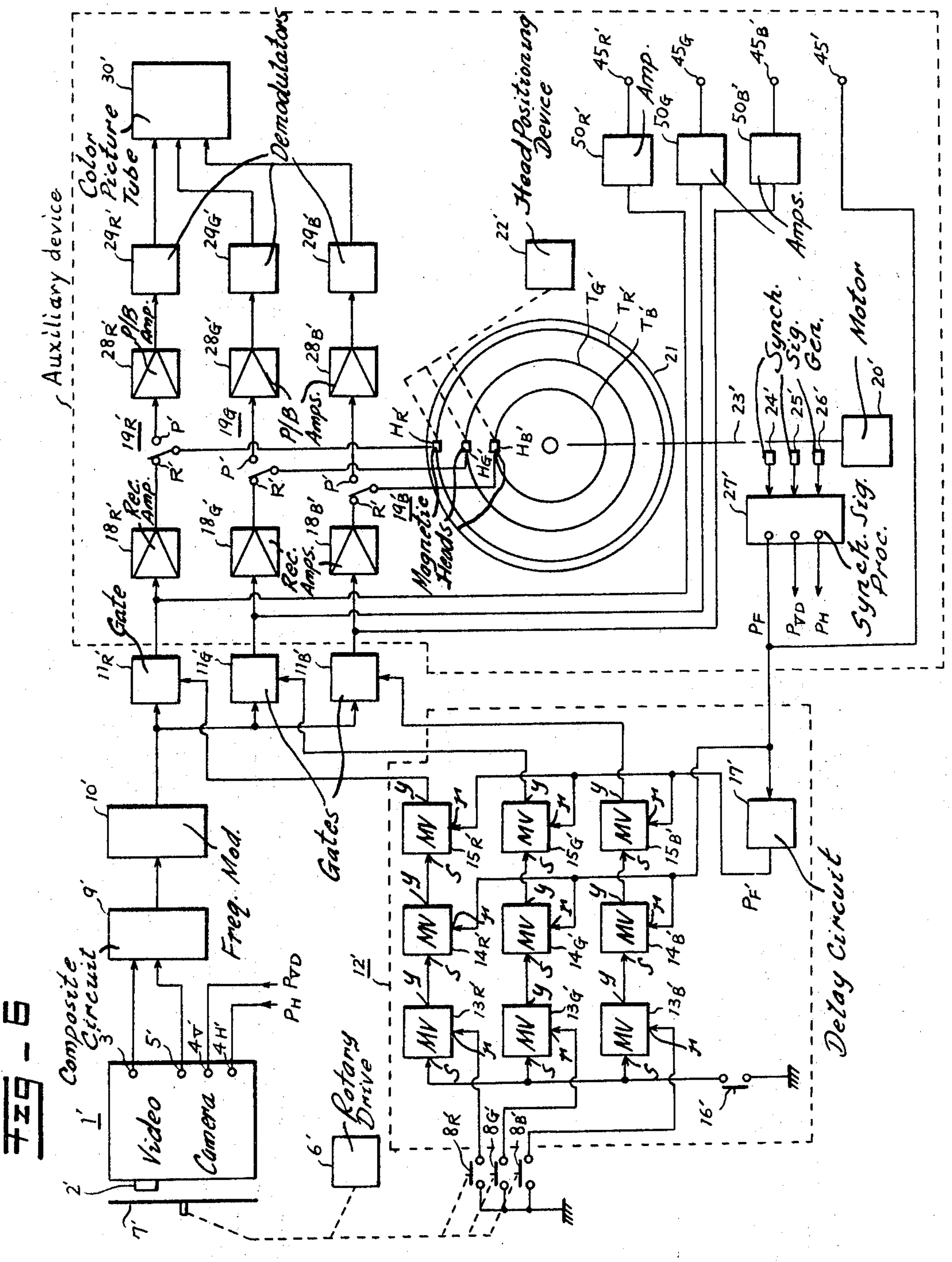
FIGS. 6 and 7 are diagrams systematically illustrating examples of auxiliary devices of this invention.
Figure 7:
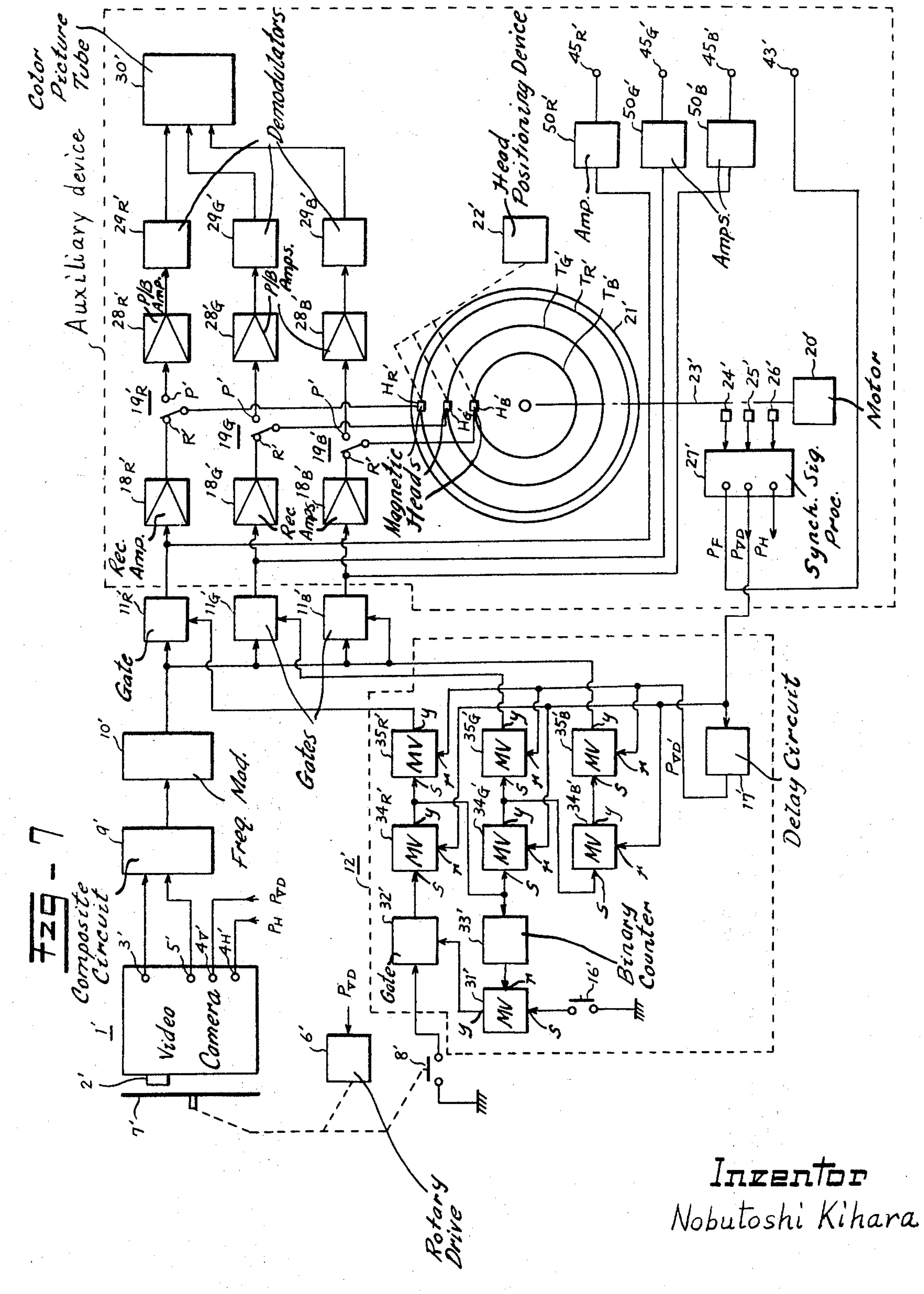

The following will describe the auxiliary device the construction of which is illustrated in FIGS. 6 and 7. The auxiliary device dotted point is exactly the same in construction as the main device described previously with FIGS. 1 and 3 except the servo circuit 40, the magnetic brake device 42 and the input terminal 43, the switching circuits 44R, 44G and 44B, the output terminals 45R, 45G and 45B, the re-recording switch 46, the multivibrator circuits 47 and 48 and the delay circuit 49 in the main device described above with FIGS. 1 and 3 and except additional elements such as will hereinafter be described. The similar components are identified at the same reference numerals and no detailed description will be given. The auxiliary device is provided with an output terminal 43′ corresponding to the input terminal 43 of the main device and input terminals 45R′, 45G′ and 45B′ corresponding to the output terminals 45R, 45G and 45B. Synchronizing pulses $P_F$ produced in the auxiliary device are applied to the output terminal 43′. Further, the input terminals 45R′, 45G′ and 45B′ are connected through amplifiers 50R′, 50G′ and 50B′ to the input sides of the recording systems of magnetic heads $H_{R'}$, $H_{G'}$ and $H_{B'}$, for example, recording amplifiers 18R′, 18G′ and 18B′.

The foregoing has been made in connection with the construction of the apparatus of this invention. Where contents recorded on the main device are re-recorded and duplicated on the auxiliary device, the terminals 43 and 43′ are connected therewith and the terminals 45R, 45G and 45B are connected respectively to the terminals 45R′, 45G′ and 45B′. Further, the switches 19R, 19G and 19B of the main device are turned to the playback side but switches 19R′, 19G′ and 19B′ of the auxiliary device are turned to the recording side, and then the re-recording switch 46 of the main device is energized. This leads to recording of the video signals $S_{R'}$, $S_{G'}$ and $S_{B'}$ and the magnetic sheet 21′ of the auxiliary device, since the servo system of the main device consists of the synchronizing pulses $P_F$ of the main and the auxiliary device.

According to this invention, the contents recorded in the main device can accurately be recorded in the auxiliary device, as has been described in the foregoing.

It will be apparent that many modifications and variations may be effected without departing from the scope of the novel concepts of this invention.

What is claimed is:

1. An apparatus for selectively recording and reproducing still color video signals, said apparatus comprising camera means for scanning a scene to be recorded and for generating signals representative of said scene, color filter means associated with said camera for dividing said signal generated by the camera into primary color signals, gate circuit means for selectively passing each of said primary color signals, gate signalling means for selectively activating each of said gate circuit means when a primary color signal to be passed by said gate circuit means has been generated, a rotary magnetic sheet, means responsive to the rotation of said sheet for generating synchronizing signals which control said gate signalling means, head means for recording said primary color signals selectively passed by said gate circuits on said sheet in individual annular tracks, means including said head means for selectively reproducing said color signals simultaneously, said synchronizing signals occurring periodically so as to allow recording of at least one field of each of said primary color signals within the respective tracks on said sheet, and display means responsive to said selective reproduction for displaying said selectively reproduced color video signals as polychromatic still video pictures of said scene.

2. An apparatus for selectively recording and reproducing still color video signals, said apparatus comprising camera means for scanning a scene to be recorded and for generating signals representative of said scene; color filter means associated with said camera for dividing said signals generated by said camera into primary color signals; a gate circuit for passing each of said primary color signals; gate signalling means for selectively activating each of said gate circuits when a primary color signal to be passed by said gate circuit has been generated, said gate signalling means comprising a multivibrator for each of said primary color signals, contact means for setting said multivibrators and switch means for resetting each of said multivibrators after the occurrence of a particular primary color signal; a rotary magnetic sheet; head means for recording said primary color signals on said sheet and for selectively reproducing said color signals; and display means for displaying said reproducing color video signals whereby still pictures are displayed of said scene.

3. An apparatus in accordance with claim 2 wherein said switch means are actuated by said color filter whereby said switches are closed upon the occurrence of predetermined color signals.

4. An apparatus in accordance with claim 3 wherein said camera sequentially generates red, green, and blue color signals and said signals include synchronizing signals generated by and proportional to the rotation of said rotary sheet.

5. An apparatus in accordance with claim 4 wherein auxiliary sheet means are provided for re-recording said color video signals recorded on said rotary magnetic sheet, said re-recording being accomplished during reproduction of said color video signals.

6. An apparatus in accordance with claim 5 wherein servo means are provided for synchronizing the speed of rotation of said rotary magnetic sheet and said auxiliary sheet means.

7. An apparatus in accordance with claim 6 wherein said signalling means comprises first, second and third multivibrators connected in series which each of said red, green and blue color signals, contact means for setting said first multivibrator, switch means responsive to the occurrence of red, green and blue color signals by said filter to reset said first multivibrator, said second mutlivibrator being set by said first multivibrator and reset by said synchronizing signal, and said third multivibrator being set by said second multivibrator and reset by said synchronizing signal but delayed in time from the synchronizing signal used to reset said second multivibrator.

References Cited

UNITED STATES PATENTS

| | | | |
|---|---|---|---|
| 2,995,619 | 8/1961 | Freeman | 178—5.2 |
| 3,267,207 | 8/1966 | Okazaki et al. | 178—5.2 |
| 3,294,902 | 12/1966 | Maxey. | |

ROBERT L. GRIFFIN, Primary Examiner

D. E. STOUT, Assistant Examiner.

U.S. Cl. X.R.

178—6.6; 179—100.2